United States Patent
Maeda

(10) Patent No.: US 7,759,890 B2
(45) Date of Patent: Jul. 20, 2010

(54) CONTROL DEVICE OF ELECTRIC POWER STEERING APPARATUS

(75) Inventor: Masahiro Maeda, Maebashi (JP)

(73) Assignee: NSK Ltd., Tokyo (JP)

( * ) Notice: Subject to any disclaimer, the term of this patent is extended or adjusted under 35 U.S.C. 154(b) by 555 days.

(21) Appl. No.: 11/775,393

(22) Filed: Jul. 10, 2007

(65) Prior Publication Data
US 2008/0018280 A1    Jan. 24, 2008

(30) Foreign Application Priority Data
Jul. 10, 2006    (JP) .................. 2006-189114

(51) Int. Cl.
*H02P 7/00*    (2006.01)
(52) U.S. Cl. .................. 318/432; 318/434; 318/467; 318/490
(58) Field of Classification Search .............. 318/432, 318/433, 434, 442, 467, 490, 504
See application file for complete search history.

(56) References Cited

U.S. PATENT DOCUMENTS

| | | | |
|---|---|---|---|
| 4,896,735 A * | 1/1990 | Morishita et al. ........... | 180/446 |
| 5,982,137 A * | 11/1999 | Endo ........................ | 318/812 |
| 6,795,762 B2 * | 9/2004 | Itoh et al. .................. | 701/43 |
| 7,389,851 B2 * | 6/2008 | Miyaura ..................... | 180/446 |
| 7,474,071 B2 * | 1/2009 | Koeppl et al. ............... | 318/489 |

FOREIGN PATENT DOCUMENTS

| | | |
|---|---|---|
| DE | 10063605 A1 | 1/2002 |
| EP | 1602555 A1 | 12/2005 |
| JP | 10-014098 A | 1/1998 |
| JP | 3777792 B2 | 3/2006 |

OTHER PUBLICATIONS

Extended European Search Report dated Aug. 1, 2008.

* cited by examiner

*Primary Examiner*—Bentsu Ro
*Assistant Examiner*—Thai Dinh
(74) *Attorney, Agent, or Firm*—Sughrue Mion, PLLC

(57) ABSTRACT

There is provided a control device of an electric power steering apparatus controlling a motor for applying steering assist torque to a steering mechanism through a driving part. The control device includes a control computation part that computes a current command value and controls the motor based on the computed current command value, a first voltage reduction monitoring part that generates a reset signal for stopping the control computation part at the time of a low voltage and a second voltage reduction monitoring part that holds reduction extent information about a power source voltage. The first and second voltage reduction monitoring parts cooperate together to monitor a reduction in the power source voltage of the control computation part.

8 Claims, 15 Drawing Sheets

CONTROL DEVICE OF ELECTRIC POWER STEERING APPARATUS

BACKGROUND OF THE INVENTION

1. Field of the Invention

The present invention relates to a control device of an electric power steering apparatus for applying steering assist force to a steering mechanism of a vehicle, and particularly to a control device of an electric power steering apparatus with high reliability constructed so that a driver does not feel a sense of discomfort at the time when after a microcomputer (including an MPU (Micro Processor Unit), an MCU (Micro Controller Unit), a CPU, etc.) of a control computation device stops a function and stops a steering assist by a low-voltage reset, a power source voltage is restored to a normal state and the control computation device restarts.

2. Description of Related Art

Referring to a general configuration of an electric power steering apparatus as shown in FIG. 13, a column shaft 2 of a steering wheel 1 is joined to tie rods 6 of steering wheels through a reduction gear 3, universal joints 4A and 4B, and a pinion rack mechanism 5. The column shaft 2 is provided with a torque sensor 10 for detecting steering torque of the steering wheel 1, and a motor 20 for assisting steering force of the steering wheel 1 is joined to the column shaft 2 through the reduction gear 3. Electric power is supplied from a battery 14 to a control unit 30 for controlling the electric power steering apparatus and also, an ignition key signal IGN is inputted to the control unit 30 through an ignition key 11. The control unit 30 computes a steering assist command value I used as an assist (steering assist) command based on steering torque Ts detected by the torque sensor 10 and a vehicle speed V detected by a vehicle speed sensor 12, and controls a current supplied to the motor 20 based on the computed steering assist command value I.

The control unit 30 is mainly constructed of a microcomputer, and general function and configuration of its control device are shown in FIG. 14. FIG. 14 is an example of a function and a configuration of the case of driving and controlling a three-phase (a, b and c phases) brushless motor 40. The steering torque Ts detected by the torque sensor 10 and the vehicle speed V detected by the vehicle speed sensor 12 are inputted to a control computation device 50 acting as a control computation part, and a current command value computed by the control computation device 50 is inputted to a gate driving circuit 43. A gate driving signal formed based on the current command value etc. by the gate driving circuit 43 is inputted to a motor driving circuit 44 made of a bridge configuration of FET, and the motor driving circuit 44 drives the three-phase brushless motor 40 through a breaking device 42 for emergency stop. Each of the phase currents of the three-phase brushless motor 40 is detected by a current detection circuit 45, and motor currents ia to ic of three phases detected are inputted to the control computation device 50 as feed back currents. Also, a rotational sensor 41 such as a Hall sensor is attached to the three-phase brushless motor 40, and a rotational signal RT from the rotational sensor 41 is inputted to a rotor position detection circuit 46, and a rotational position θ detected is inputted to the control computation device 50.

Also, the ignition key signal IGN from the ignition key 11 is inputted to an ignition voltage monitor part 15 and a power source circuit part 60, and a power source voltage Vdd is inputted from the power source circuit part 60 to the control computation device 50 and also, a reset signal RS used for an apparatus stop is inputted to the control computation device 50. The motor driving circuit 44 is constructed of six FETs Tr1 to Tr6 constructing a three-phase bridge, and the breaking device 42 is constructed of relay contacts 421 and 422 for breaking two phases. There lay contacts 421 and 422 are normally turned on, and the present example is constructed so as to break a and b phases in an emergency, but combinations of other phases may be used.

Details of the power source circuit part 60 and the control computation device 50 are configured as shown in FIG. 15. The power source circuit part 60 is constructed of a stabilization device 61 for outputting a stabilized power source voltage Vdd of, for example, 5 V based on the ignition key signal IGN, a low-voltage detection circuit 621 for detecting a low voltage (threshold Th1) of the power source voltage Vdd and a reset generation circuit 622 for outputting the reset signal RS when a low voltage is detected, and a voltage reduction monitoring part 62 is constructed of the low-voltage detection circuit 621 and the reset generation circuit 622.

The threshold Th1 is set in the voltage reduction monitoring part 62 and when the power source voltage Vdd becomes the threshold Th1 or less, the reset signal RS is outputted and a CPU 51 and a peripheral circuit 53 are deactivated.

Also, the control computation device 50 is a microcomputer and is constructed of the CPU 51 for performing the whole control, a ROM/RAM part 52 for storing data, programs, etc., and the peripheral circuit 53 used as an interface with peripheral equipment, and the power source voltage Vdd from the power source circuit part 60 is supplied to the CPU 51, the ROM/RAM part 52 and the peripheral circuit 53, and the reset signal RS is inputted to the CPU 51 and the peripheral circuit 53, and the steering torque T, the vehicle speed V, the motor currents ia to ic and the rotor position θ are inputted to the peripheral circuit 53.

Such a conventional electric power steering apparatus is constructed so as to start an assist (steering assist) after an operation of the control computation device 50 is checked by initial diagnosis when the ignition key 11 is changed from an off state to an on state. As a result of this, a time delay of about one second is caused before the steering assist is started after the ignition key 11 is turned on. Then, even when this behavior is a temporary reduction in the power source voltage Vdd, a RAM value of the inside of the CPU 51 cannot be held due to the reduction in the voltage, so that when the microcomputer of the control computation device 50 stops by a low-voltage reset, in a manner similar to processing at the time of turning on the ignition key 11, it is necessary to perform starting processing such as initial diagnosis before the steering assist is started after the power source voltage Vdd is restored normally, and a time delay of about one second developed.

For example, when after an engine is once started, the engine stops and the engine is again started (second cranking), a power source voltage reduces temporarily during operation of the control device of the electric power steering apparatus. Particularly when a power source (battery 14) deteriorates, the power source voltage reduces greatly and in that case, there is probably a possibility that a microcomputer of the control device stops by a low-voltage reset, and there was a problem that a burden on a driver becomes big until a steering assist is started.

In the CPU 51, the minimum voltage necessary to hold a RAM value of the inside of the CPU 51 is lower than a voltage (threshold Th1) in which a reset of the CPU 51 is generated and when a voltage reduction value is higher than or equal to the minimum voltage necessary to hold the RAM value, there is no change in the RAM value even when the reset of the CPU 51 is generated.

From the fact described above, it is requested that by monitoring time or the extent of a reduction in a power source voltage, the contents of initial diagnosis of restarting of a control computation device (microcomputer) should be limited according to the time and the extent of the reduction in the power source voltage and a speedy steering assist can be started, and it is necessary to reduce a burden on a driver.

SUMMARY OF THE INVENTION

The invention has been implemented in view of the circumstances as described above, and an object of the invention is to provide a control device of an electric power steering apparatus constructed so that the contents of initial diagnosis of restarting of a control computation part are limited according to time or the extent of a reduction in a power source voltage and a start of a steering assist can be speeded up according to a state.

According to an aspect of the invention, there is provided a control device of an electric power steering apparatus, which controls a motor for applying steering assist torque to a steering mechanism through a driving part, including:

a control computation part that computes a current command value and controls the motor based on the computed current command value;

a first voltage reduction monitoring part that generates a reset signal for stopping the control computation part at the time of a low voltage; and a second voltage reduction monitoring part that holds reduction extent information about a power source voltage, wherein the first and second voltage reduction monitoring parts cooperate together to monitor a reduction in the power source voltage of the control computation part.

Further, according to another aspect of the invention, it is adaptable that the second voltage reduction monitoring part is provided inside the control computation part.

According to still another aspect of the invention, it is adaptable that the reset signal is released when a first predetermined time has elapsed after the power source voltage is restored.

According to still another aspect of the invention, it is adaptable that the reduction extent information is released when the first predetermined time has elapsed.

According to still another aspect of the invention, it is adaptable that the control device of the electric power steering apparatus further including:

an operation decision part that decides an operation method for starting a steering assist operation based on information about the second voltage reduction monitoring part at the time of releasing the reset signal and restarting the control computation part.

According to still another aspect of the invention, it is adaptable that the control device of the electric power steering apparatus, further including:

a time measurement part that measures stop time during which the reset signal is generated.

According to still another aspect of the invention, it is adaptable that an operation method for starting a steering assist at the time of restarting is decided based on a second predetermined time of the measurement time of the time measurement part.

According to still another aspect of the invention, it is adaptable that the control computation part is constructed of at least one of a microcomputer, an MPU and an MCU.

According to a control device of an electric power steering apparatus of the invention, a voltage reduction monitoring part capable of holding information as to what extent a power source voltage reduces is disposed, so that it can be determined whether it is starting of a control computation part by turning on an ignition key or restarting after a temporary voltage reduction due to second cranking etc.

Also, by disposing a time measurement part for measuring time for which a reset signal is generated by a low voltage, time for which a steering assist is stopped can be measured, and steering assist force or timing of starting a steering assist after restarting can be decided.

DETAILED DESCRIPTION OF EXEMPLARY EMBODIMENTS OF THE INVENTION EMBODIMENTS

The invention can start a speedy steering assist by automatically selecting the presence or absence of release change processing or the contents of initial diagnosis of restarting of a control computation part (microcomputer etc.) according to time and the extent of a reduction in a power source voltage by monitoring the time and the extent of the reduction in the power source voltage.

Embodiments of the invention will be described below with reference to the drawings.

Figure 1:
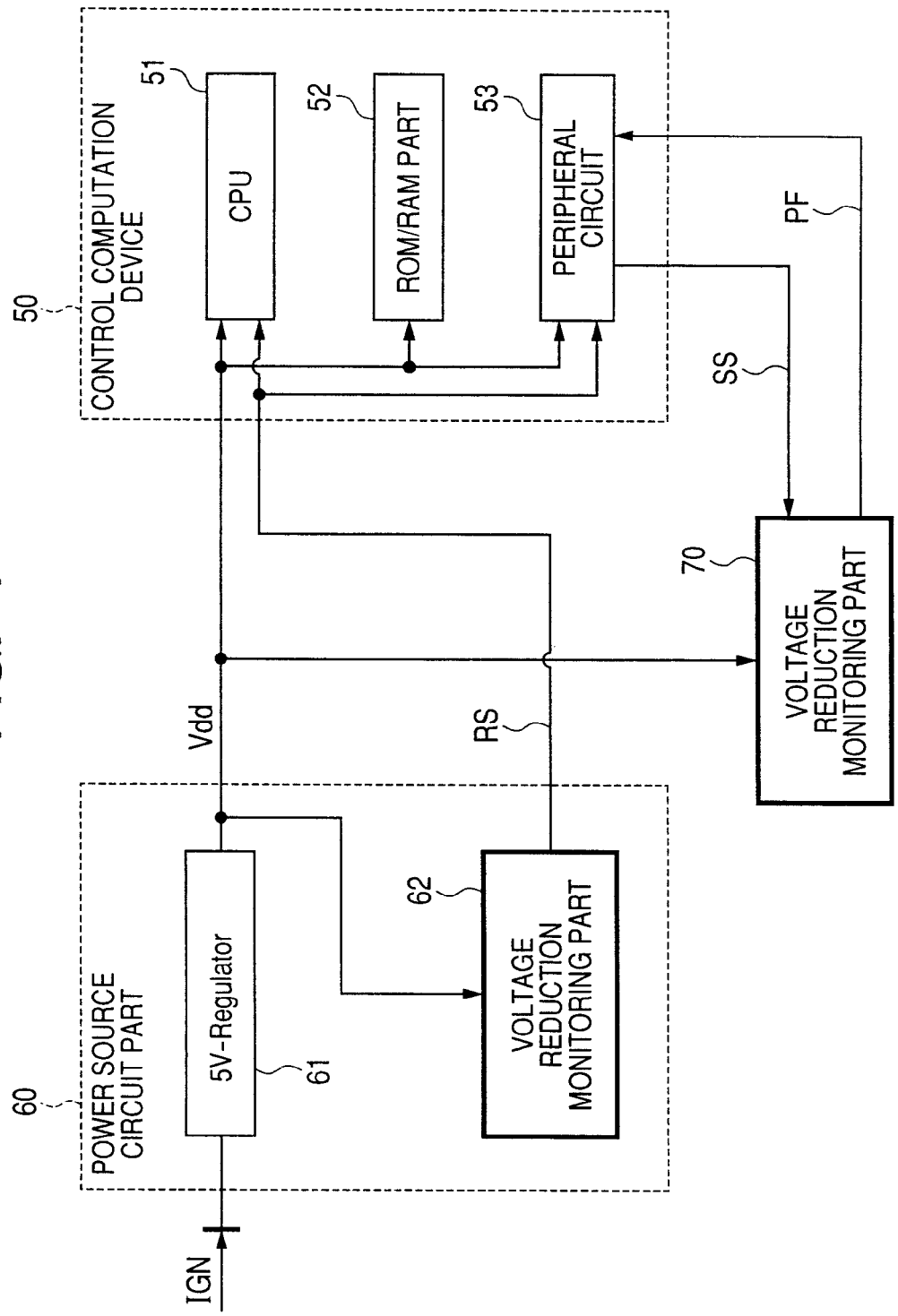
FIG. 1 is a block diagram showing a configuration example of the first embodiment of the invention.
Figure 15:
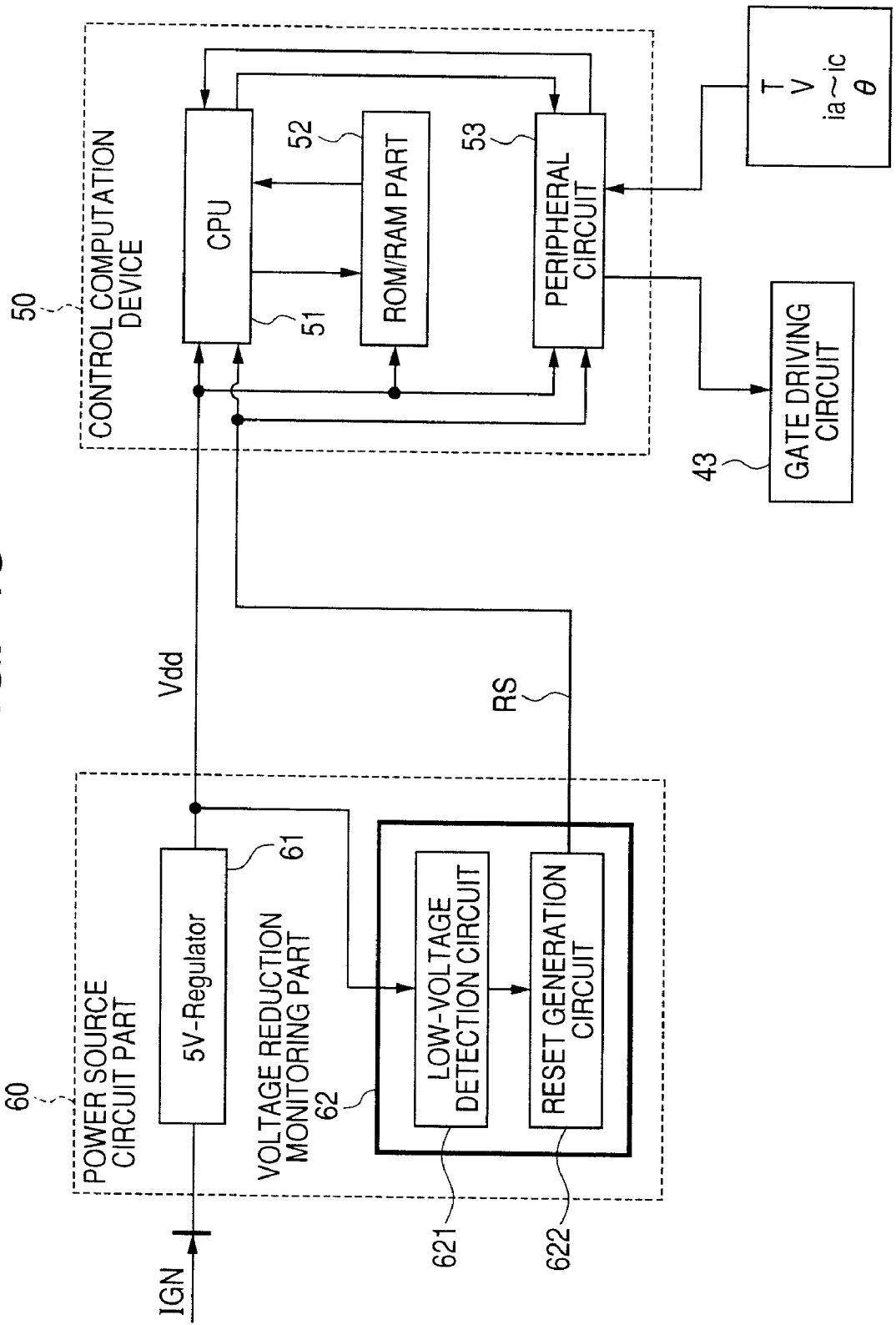
FIG. 15 is a block diagram showing a configuration example of a power source circuit part and a control computation device.

FIG. 1 is a block diagram showing a configuration example (first embodiment) of the invention with the configuration example associated with FIG. 15, and description is omitted by assigning the same numerals to the same members.

In the invention, in addition to a voltage reduction monitoring part 60, another voltage reduction monitoring part 70 is disposed and a power source voltage Vdd is inputted to the voltage reduction monitoring part 70 and also a set signal SS is inputted from a peripheral circuit 53. Two thresholds Th1 and Th3 are set in the voltage reduction monitoring part 60, and a threshold Th2 of a value near to the minimum voltage in which a CPU 51 can hold data of a RAM value is set in the voltage reduction monitoring part 70, and this threshold Th2 is smaller than the threshold Th1 of a value for resetting and stopping the CPU 51. Then, when a reduction in the power source voltage Vdd of the threshold Th2 or less is detected, the voltage reduction monitoring part 70 outputs a power-on flag PF used as reduction extent information about the power source voltage Vdd and the power-on flag PF is inputted to the peripheral circuit 53. Since the threshold Th3 is a value for determining a restoring of rest, the threshold Th3 is somewhat larger than the threshold Th1. That is, a relation among the thresholds Th1 to Th3 of the voltage reduction monitoring parts 62 and 70 becomes Th3>Th1>Th2.

When the power source voltage Vdd becomes the threshold Th2 or less, the voltage reduction monitoring part 70 outputs the power-on flag PF and when the set signal SS is inputted from the peripheral circuit 53, the power-on flag PF is released.

Figure 2:
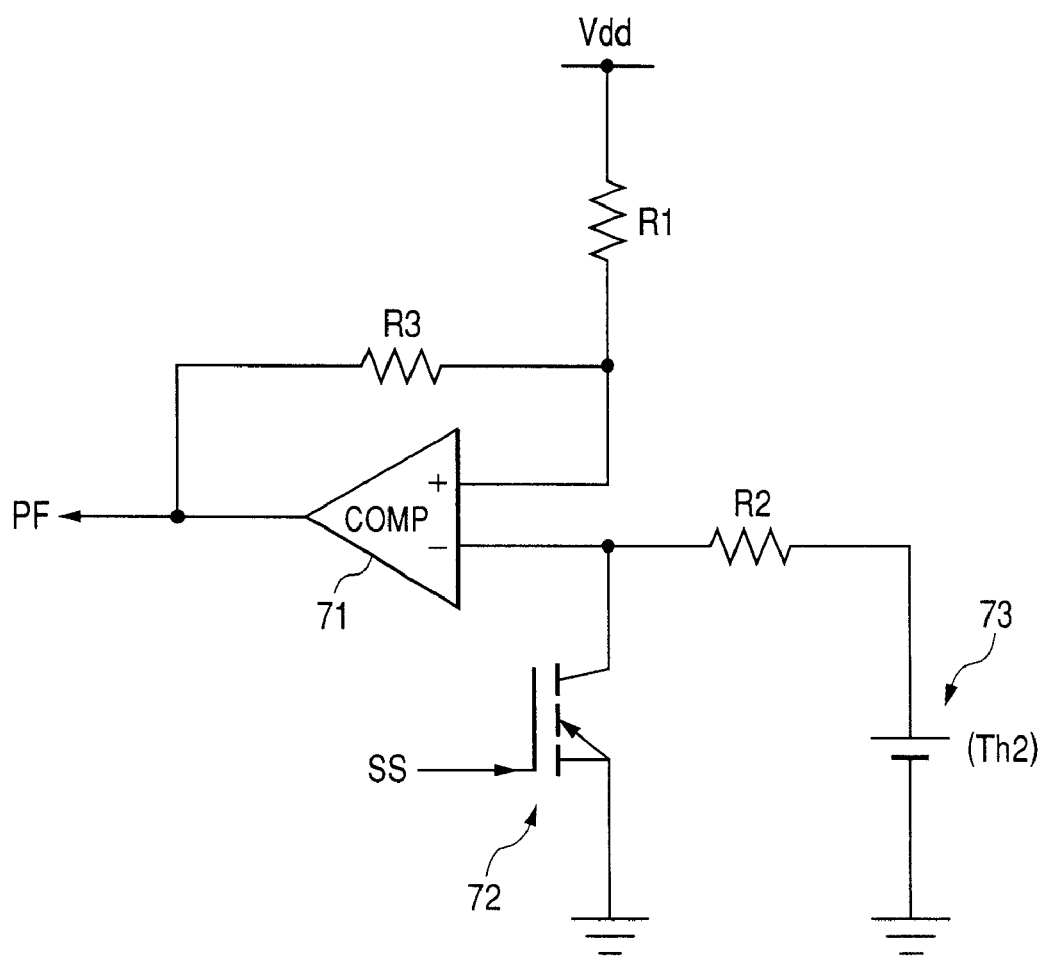
FIG. 2 is a circuit diagram showing a configuration example of a voltage reduction monitoring part.

In addition, a configuration of the voltage reduction monitoring part 70 is a circuit diagram shown in, for example, FIG. 2, and the power source voltage Vdd is inputted to a positive input terminal of a comparator 71 through a resistor R1 and a power source 73 used as the threshold Th2 is inputted to a negative input terminal through a resistor R2. Also, a transistor 72 which is normally in an off state and is turned on by an input of the set signal SS is connected between the negative input terminal and a ground, and a differential output of the comparator 71 is outputted as the power-on flag PF.

Figure 3:
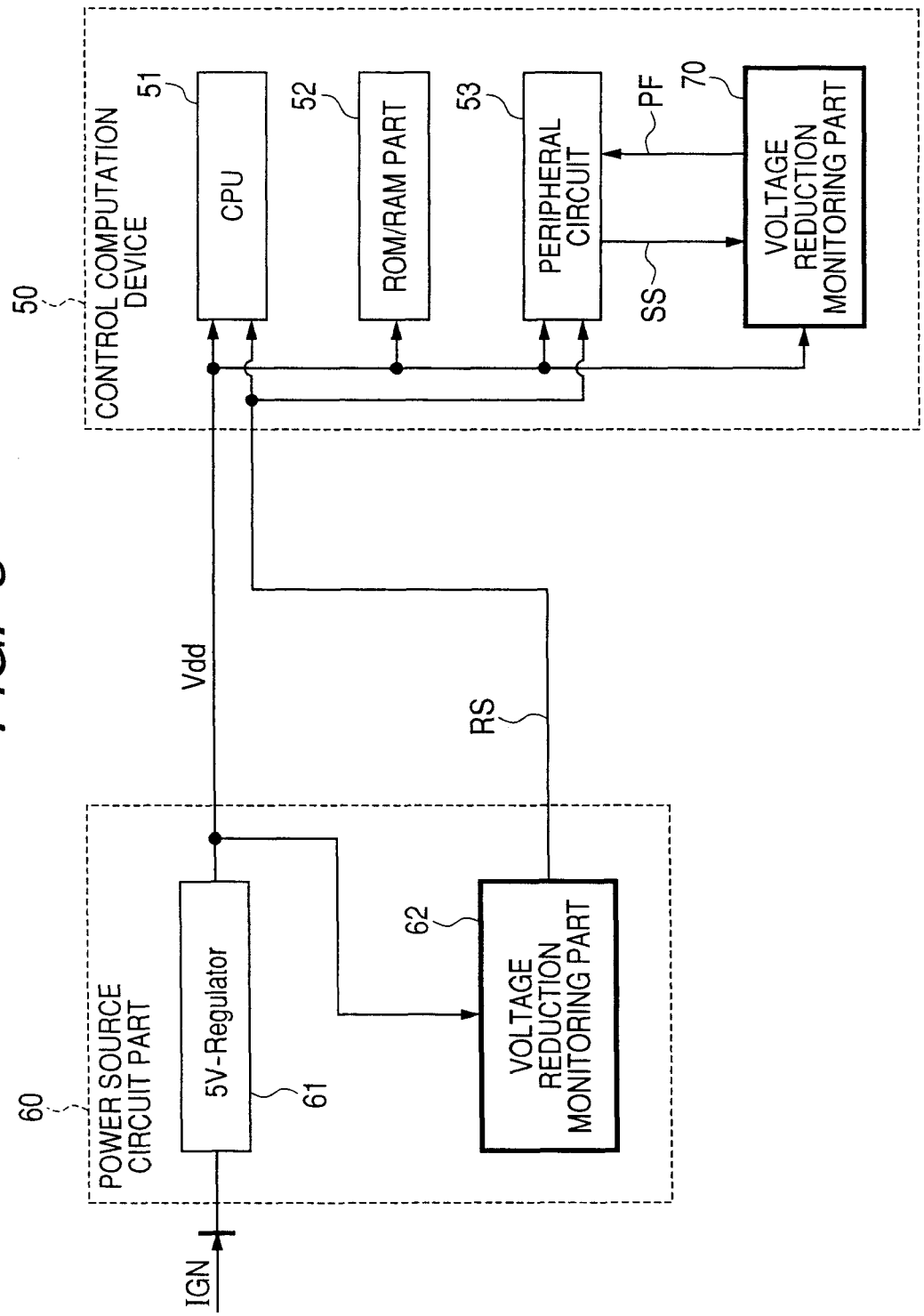
FIG. 3 is a block diagram showing another configuration example of the second embodiment of the invention.

Also, in the first embodiment of FIG. 1, the voltage reduction monitoring part 70 is provided in the outside of a control computation device 50, but the voltage reduction monitoring part 70 may be constructed so as to be provided in the inside of the control computation device 50 as shown in FIG. 3 (second embodiment).

Figure 4:
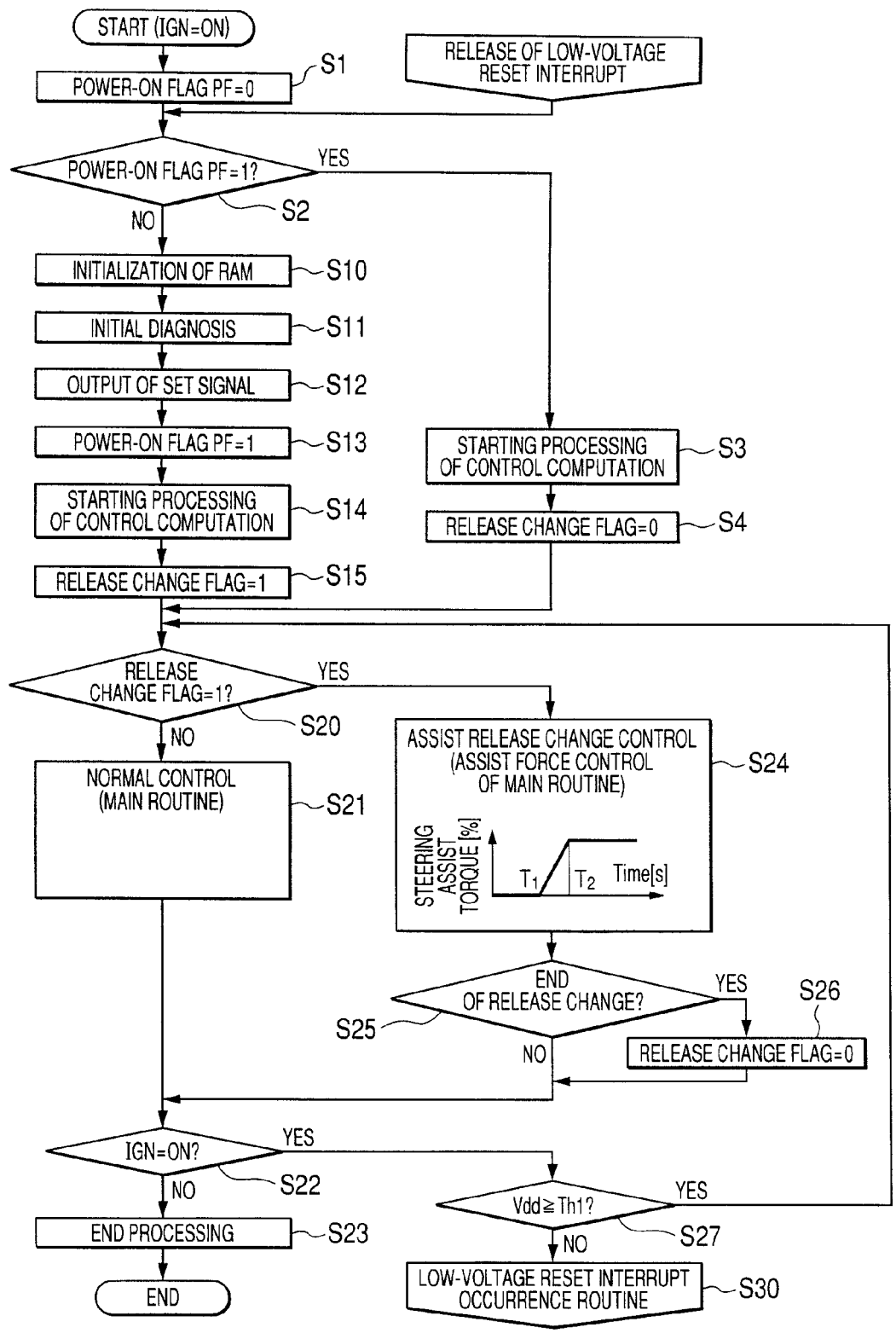
FIG. 4 is a part of the flowchart showing an operation example of the invention.

An operation example in such a configuration will be described with reference to flowcharts of FIGS. 4 and 5 and a time chart of FIG. 6.

When an operation is started, a power-on flag PF of the voltage reduction monitoring part 70 is set at "0" (L level) (step S1), and the CPU 51 determines whether or not the power-on flag PF is "1" (H level) (step S2). The power-on flag PF is a signal outputted from the voltage reduction monitoring part 70, and becomes "0" (L level) when a power source voltage Vdd becomes a threshold Th2 or less during a reset (stop) of the control computation device 50 (microcomputer), and a function of the voltage reduction monitoring part 70 continues even when the control computation device 50 is stopping independently of an operation of the control computation device 50. Then, when a set signal SS is inputted from the peripheral circuit 53, the power-on flag PF is released and becomes "1" (H level).

In addition, when the power-on flag PF is a digital signal, the power-on flag PF is fixed at "0" (L level) when the power source voltage Vdd becomes the threshold Th2 or less, and when the power-on flag PF is an analog signal, the minimum voltage value indicating where the power source voltage Vdd reduces is held and is inputted to the peripheral circuit 53 by an analog voltage and A/D processing is performed by the peripheral circuit 53. Also, when the power source voltage Vdd does not fall below the threshold Th2 in the case where the power-on flag PF is the digital signal, the power-on flag PF is maintained at "1" (H level) even when a reset signal RS is inputted.

In the case of determining that the power-on flag PF is "1" (H level) in step S2, the control computation device 50 performs starting processing of control computation (step S3) and a release change flag is set at "0" and the flow chart proceeds to step S20 described below (step S4). In addition, the release change flag is a flag for deciding whether or not to perform processing for gradually increasing an assist at the time of starting or restarting the control computation device 50, and it is constructed so that the assist increase processing is not performed when the release change flag is "0" and the assist increase processing is performed when the release change flag is "1".

Also, in the case of determining that the power-on flag PF is "0" (L level) in step S2, RAM of a ROM/RAM part 52 is initialized (step S10) and predetermined initial diagnosis is made (step S11) and a set signal SS is outputted (step S12) and the power-on flag PF is set at "1" (H level) (step S13). Then, starting processing of the control computation device 50 is performed (step S14) and the release change flag is set at "1" (step S15) and it is determined whether or not the release change flag is "1" (step S20).

In the case of determining that the release change flag is not "1", that is, the release change flag is "0" in step S20, it is normal control (main routine) (step S21) and it is determined whether or not an ignition key 11 is in an on state (step S22), and when the ignition key 11 is in an off state, end processing is performed and the system becomes a stop (step S23). On the other hand, when the ignition key 11 is in the on state, the voltage reduction monitoring part 62 determines whether or not the power source voltage Vdd is a threshold Th1 or less (step S27), and when the power source voltage Vdd is the threshold Th1 or less, the flowchart proceeds to step S30 by low-voltage reset interrupt processing and when the power source voltage Vdd is larger than the threshold Th1, the flowchart returns to step S20.

On the other hand, in the case of determining that the release change flag is "1" in step S20, it becomes assist release change control and an assist force limit of the main routine is performed (step S24). The assist release change control is control in which first, an assist is not performed and steering assist force is gradually increased after a lapse of predetermined time T1 and the steering assist force is kept at a constant value after a lapse of predetermined time T2 (>T1) as shown in a block of step S24. It is determined whether or not a release change ends after such assist release change control (step S25), and when the release change does not end, the flowchart proceeds to step S22 and when the release change ends, the release change flag is set at "0" and the flowchart proceeds to step S22.

Figure 5:
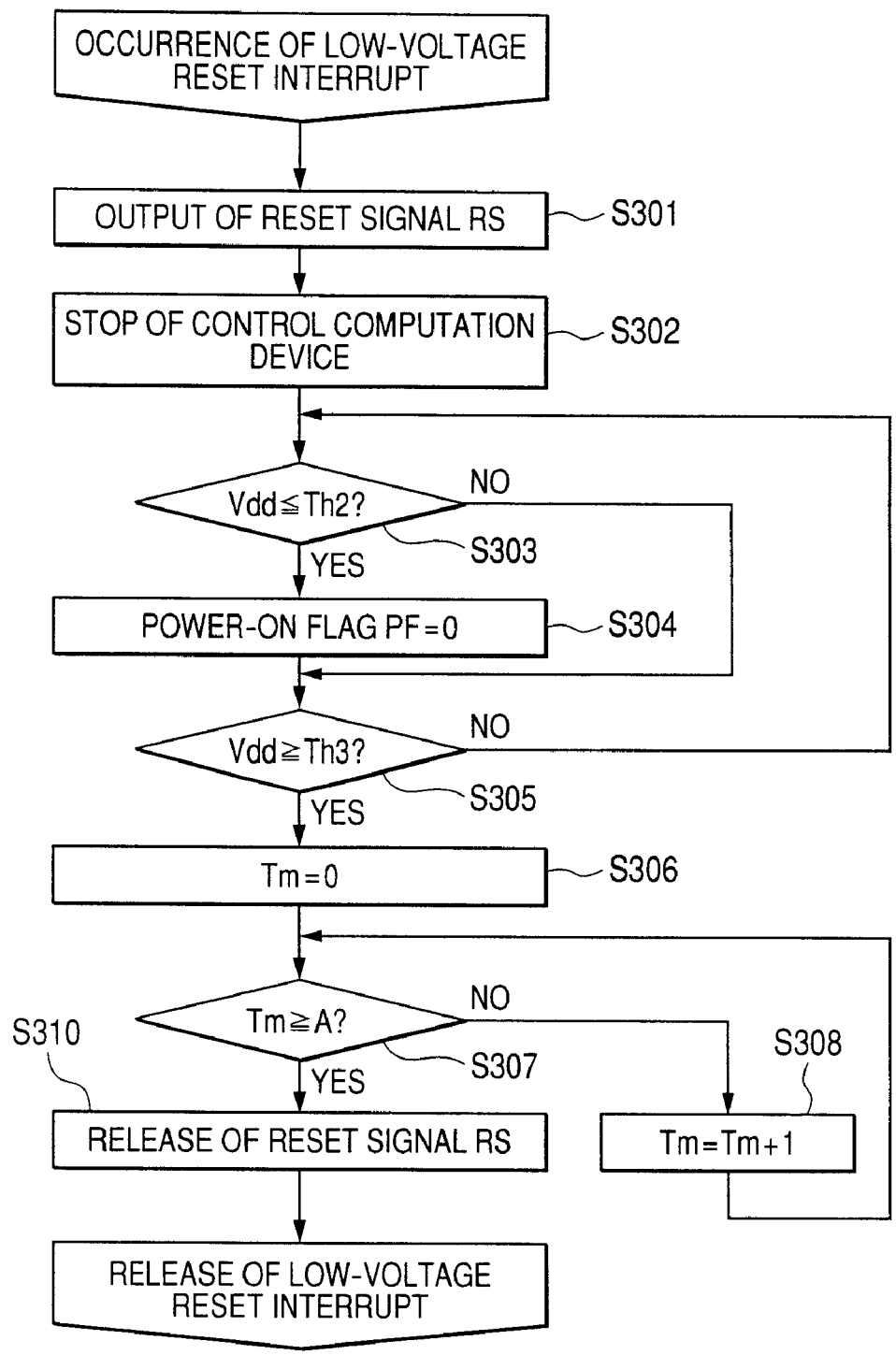
FIG. 5 is a part of the flowchart showing an operation example of the invention.
Figure 6:
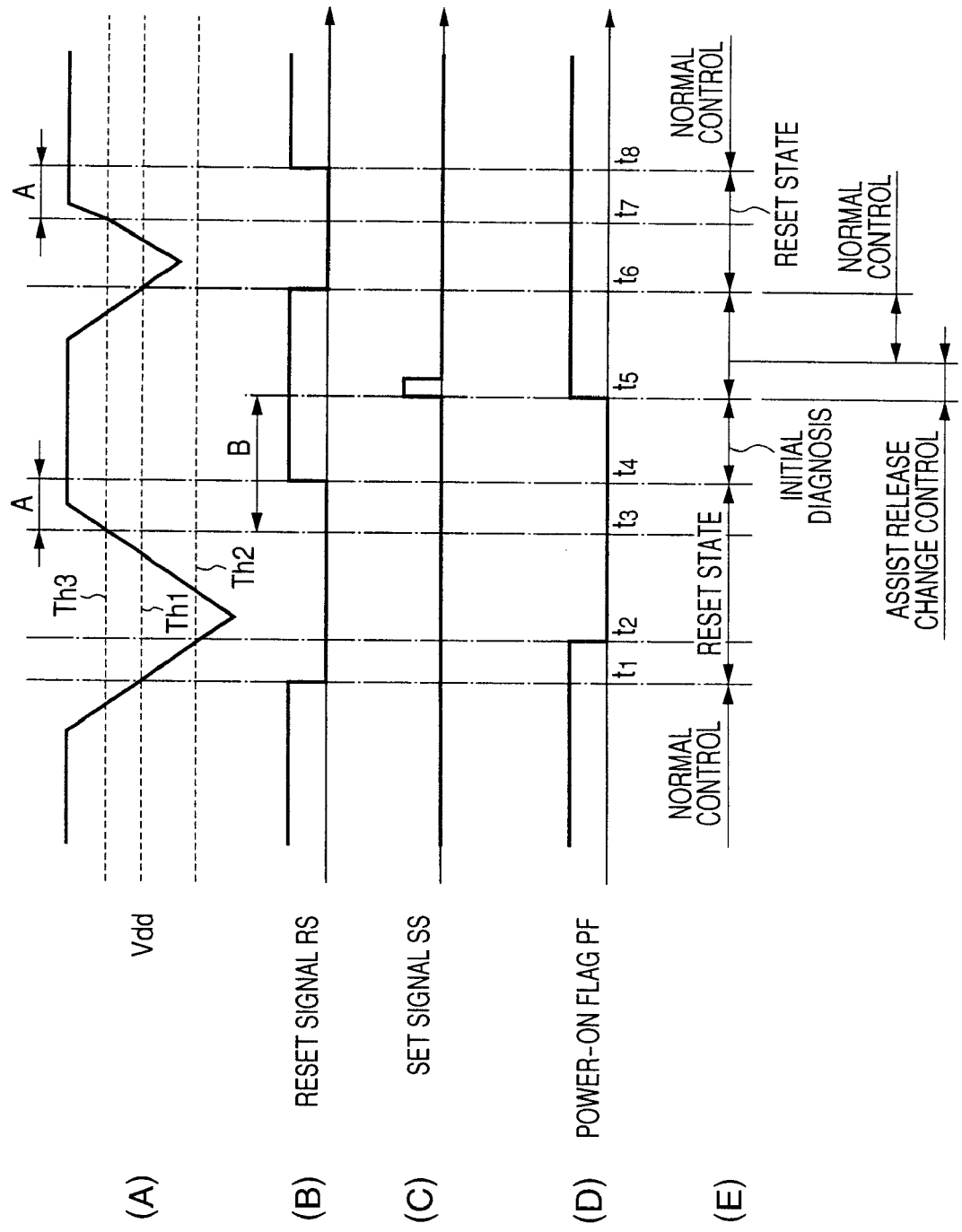
FIG. 6 is a time chart showing an operation example of the invention.

Routine processing in the case of occurrence of a low-voltage reset interrupt is executed according to the flowchart of FIG. 5, and its execution is at the time when the power source voltage Vdd becomes the threshold Th1 or less at a point in time t1 shown in FIG. 6(A). When the power source voltage Vdd becomes the threshold Th1 or less, a reset signal RS is outputted from the voltage reduction monitoring part 62 at the point in time t1 as shown in FIG. 6(B) (step S301) and the control computation device 50 becomes a stop (reset state) (step S302). Then, the voltage reduction monitoring part 70 determines whether or not the power source voltage Vdd becomes the threshold Th2 or less (step S303), and when the power source voltage Vdd further reduces and the power source voltage Vdd becomes the threshold Th2 or less at a point in time t2 as shown in FIG. 6(A), the power-on flag PF is outputted as "0" (L level) (step S304).

After the power-on flag PF is outputted as "0" (L level) or when the power source voltage Vdd does not become the threshold Th2 or less in step S303, the voltage reduction monitoring part 70 determines whether or not the power source voltage Vdd becomes more than or equal to a threshold Th3 for a reset restore (step S305), and when the power source voltage Vdd does not become the threshold Th3 or more, the flowchart returns to step S303. Also, when the reset is restored at a point in time t3 as shown in FIG. 6(A), a timer for stable time measurement is cleared (step S306) and a counting operation (a counted value Tm) is repeated until predetermined time A has elapsed since the point in time t3 of the reset restore (steps S307, S308), and when the counted value Tm of the timer for stable time measurement becomes the predetermined time A or longer (a point in time 4 of FIG. 6), the reset signal RS is released and the low-voltage reset interrupt is released (steps S307, S310). In addition, the predetermined time A in step S307 is delay time predetermined in order to secure time taken to stabilize clock oscillation of the control computation device 50 since the power source voltage Vdd exceeded the threshold Th3 after restoring from the reset.

By releasing the low-voltage reset interrupt, the flowchart returns to step S2. In this case, the power source voltage Vdd falls below the threshold Th2 during a reset period (the point in time t2 of FIG. 6), so that the power-on flag PF is "0" (L level) and the determination in step S2 becomes "No". Therefore, the control proceeds to step S10 and an initialization routine of normal electric power steering is executed.

On the other hand, when the power source voltage Vdd reduces and becomes the threshold Th1 or less at another timing (point in time t6), the CPU 51 becomes a reset state and during a reset period (steps S303, S304) of FIG. 5, the power source voltage Vdd does not fall below the threshold Th2 and becomes the threshold Th3 or more (point in time t7). At this time, the power-on flag PF is held at "1", so that the determination in the case of returning to step S2 of FIG. 4 after a reset interrupt is released becomes "Yes", and steps S10 to S15 of RAM initialization etc. are not performed, and starting processing of control computation (step S3) and processing of the release change flag=0 (step S4) are performed and the flowchart proceeds to normal assist control.

From the above description, when the power source voltage Vdd changes as shown in FIG. 6(A), the state is normal control to the point in time t1 and the state is a reset state at the points in times t1 to t4 and the state is a period for which initial diagnosis is made at the points in times t4 to t5 and the state is assist release change control for a predetermined period of the points in times t5 to t6 and the other is normal control and the state is a reset state at the points in times t6 to t8 and the state becomes normal control after the point in time t8 as shown in FIG. 6(E). In addition, a decision of an operation method for starting a steering assist at the time of restarting is constructed so as to be made by a relation of the power source voltage Vdd at the time of a reset>the threshold Th2.

According to the first and second embodiments as described above, a selection as to whether or not to execute release change processing and initial diagnosis of restarting of the control computation device 50 can be made automatically according to a state of the power source voltage Vdd at the time of a reset.

Figure 7:
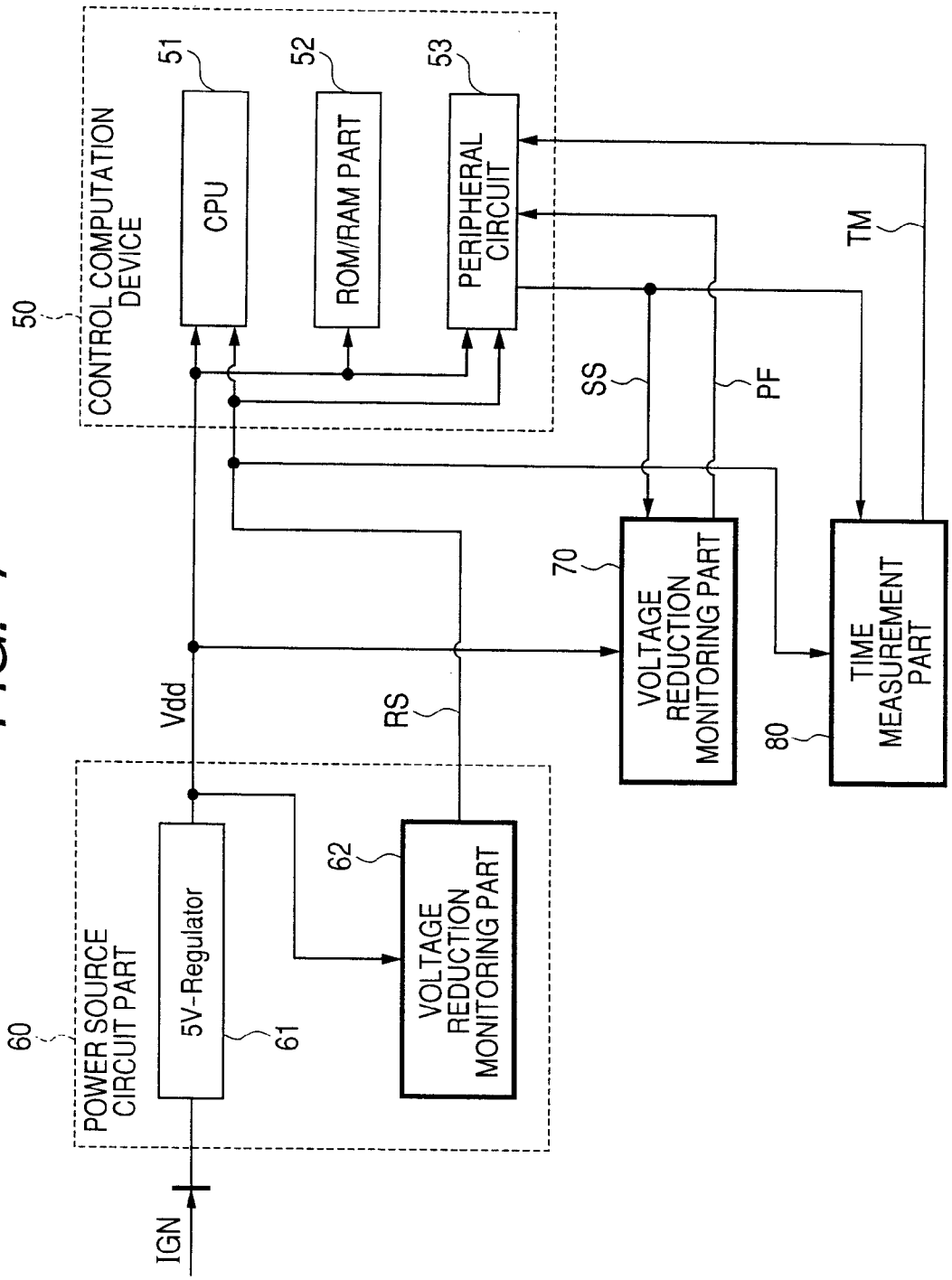
FIG. 7 is a block diagram showing a configuration example of the third embodiment of the invention.
Figure 8:
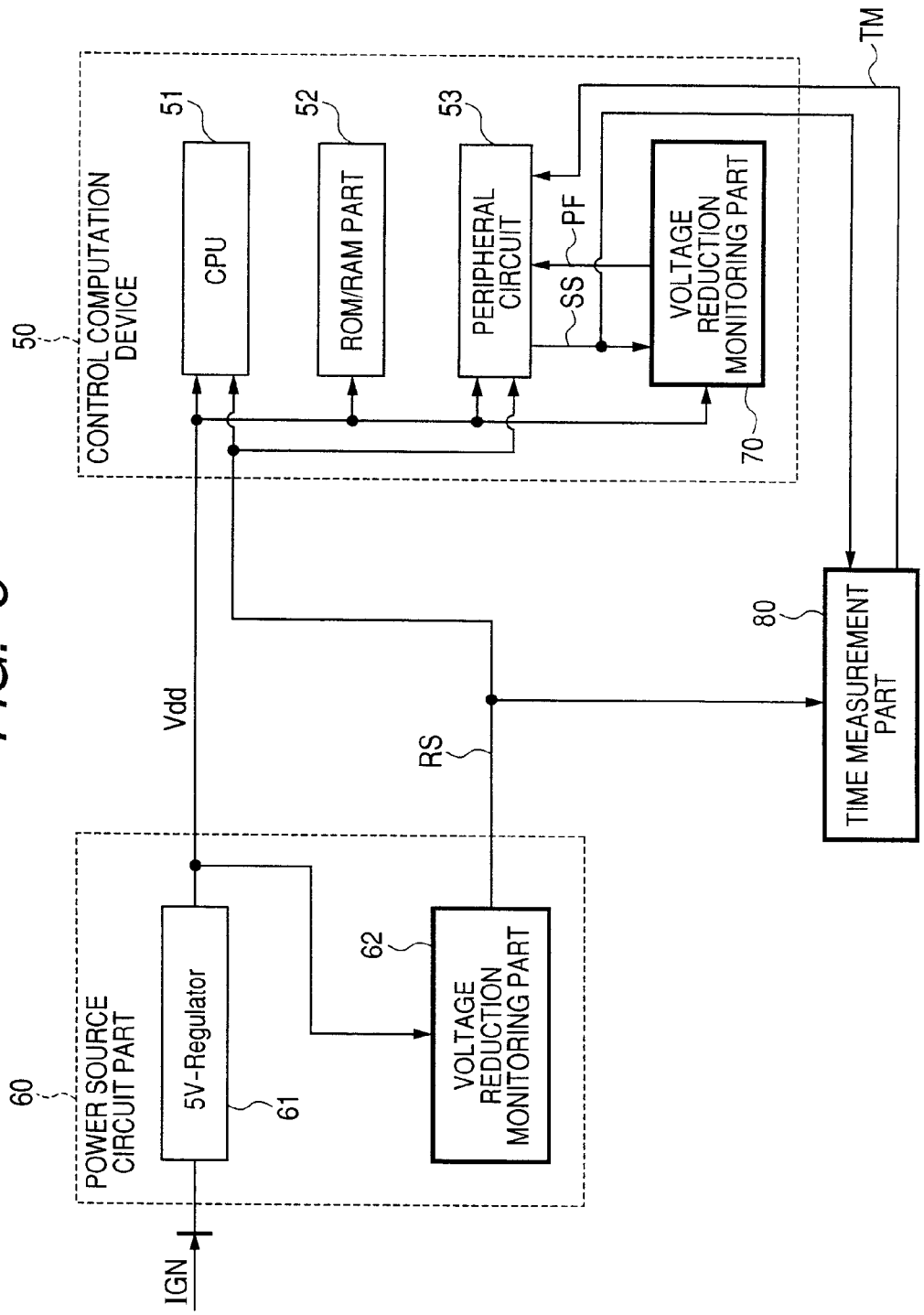
FIG. 8 is a block diagram showing a configuration example of the fourth embodiment of the invention.

Next, another configuration example (third embodiment) of the invention is shown in FIG. 7 with the configuration example associated with FIG. 1. In the present example, a time measurement part (timer for stop time measurement) 80 for measuring stop time based on a reset signal RS and a set signal SS is disposed. In addition, in the third embodiment of FIG. 7, a voltage reduction monitoring part 70 is provided in the outside of a control computation device 50, but the voltage reduction monitoring part 70 may be provided in the inside of the control computation device 50 as shown in FIG. 8 (fourth embodiment).

Figure 9:
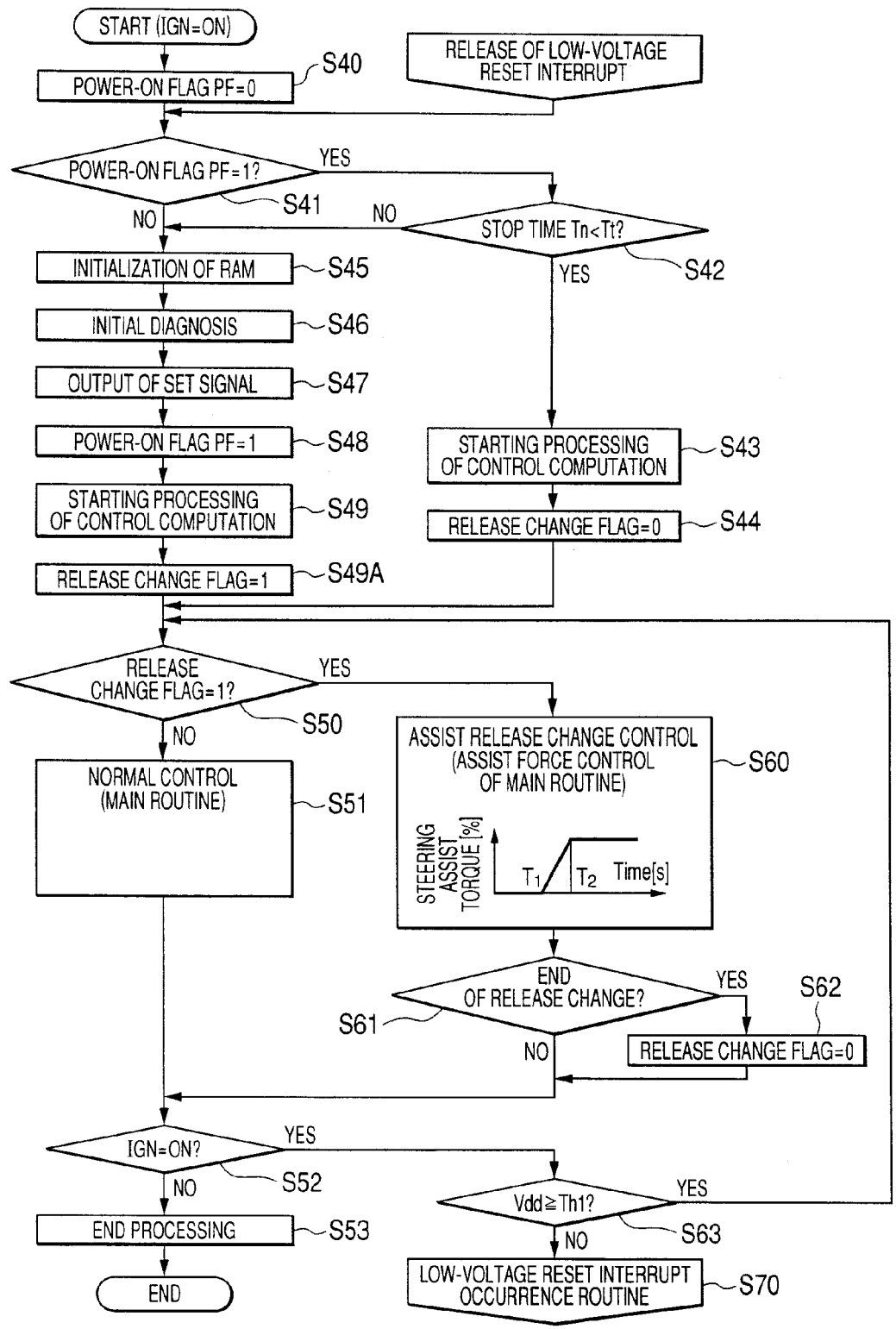
FIG. 9 is a part of the flowchart showing an operation example of the invention.

An operation example in such a configuration will be described with reference to flowcharts of FIGS. 9 and 10.

When an operation is started, a power-on flag PF is set at "0" (L level) (step S40), and it is determined whether or not the power-on flag PF is "1" (H level) (step S41). Then, in the case of determining that the power-on flag PF is "1" (H level), it is determined whether or not stop time Tn measured by the time measurement part 80 (timer for stop time measurement) is smaller than a threshold Tt (step S42), and when the stop time Tn is smaller than the threshold Tt, the control computation device 50 performs starting processing of control computation (step S43) and a release change flag is set at "0" and the flowchart proceeds to step S50 described below (step S44).

In the case of determining that the power-on flag PF is "0" (L level) in step S41 and the case where the stop time Tn becomes the threshold Tt or more in step S42, RAM of a ROM/RAM part 52 is initialized (step S45) and predetermined initial diagnosis is made (step S46) and a set signal SS is outputted (step S47) and the power-on flag PF is set at "1" (H level) (step S48). Then, starting processing of the control computation device 50 is performed (step S49) and a release change flag is set at "1" (step S49A) and it is determined whether or not the release change flag is "1" (step S50).

In the case of determining that the release change flag is not "1" in step S50, it is normal control (main routine) (step S51) and it is determined whether or not an ignition key 11 is in an on state (step S52), and when the ignition key 11 is in an off state, end processing is performed and it becomes the end (step S53). When the ignition key 11 is in the on state, a voltage reduction monitoring part 62 determines whether or not a power source voltage Vdd is a threshold Th1 or less (step S63), and when the power source voltage Vdd is the threshold Th1 or less, the flowchart proceeds to a low-voltage reset interrupt occurrence routine (step S70) and when the power source voltage Vdd is larger than the threshold Th1, the flowchart returns to step S50.

On the other hand, in the case of determining that the release change flag is "1" in step S50, it becomes assist release change control and an assist force limit of the main routine is performed (step S60). The assist release change control is similar to step S24 described above. It is determined whether or not a release change ends after the assist release change control (step S61), and when the release change does not end, the flowchart proceeds to step S52 and when the release change ends, the release change flag is set at "0" and the flowchart proceeds to step S52 (step S62).

Figure 10:
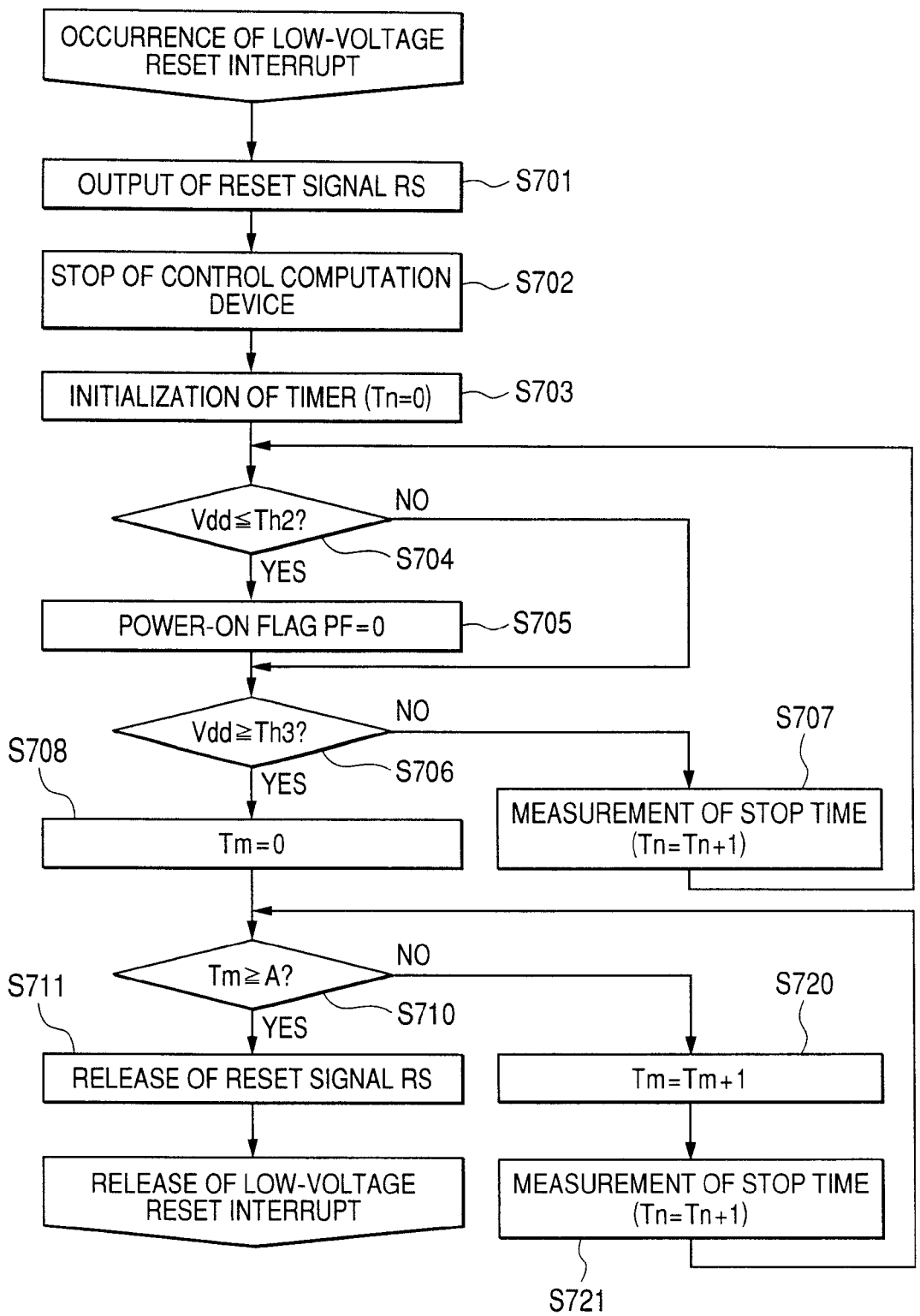
FIG. 10 is a part of the flowchart showing an operation example of the invention.

Routine processing in the case of occurrence of a low-voltage reset interrupt is executed according to the flowchart of FIG. 10, and its execution is at the time when the power source voltage Vdd becomes the threshold Th1 or less. When the power source voltage Vdd becomes the threshold Th1 or less, a reset signal RS is outputted from the voltage reduction monitoring part 62 (step S701) and the control computation device 50 becomes a stop (step S702). Then, the time measurement part 80 (timer for stop time measurement) is initialized (step S703) and it is determined whether or not the power source voltage Vdd becomes a threshold Th2 or less (step S704), and when the power source voltage Vdd becomes the threshold Th2 or less, the voltage reduction monitoring part 70 outputs the power-on flag PF as "0" (L level) (step S705).

After the power-on flag PF is outputted as "0" (L level) or when the power source voltage Vdd does not become the threshold Th2 or less in step S704, it is determined whether or not the power source voltage Vdd becomes a threshold Th3 or more (step S706), and when it does not become the reset restore threshold Th3 or more, the stop time Tn of the control computation device 50 is measured (step S707) and the flowchart returns to step S704. When the power source voltage Vdd becomes the threshold Th3 or more, a timer Tm for stable time measurement is cleared (step S708), and measurement of the stop time Tn and time Tm is repeated until the time Tm has elapsed by predetermined time A (steps S720, S721), and when the counted time Tm of the timer for stable time measurement becomes the predetermined time A or longer, the reset signal RS is released (step S711) and the low-voltage reset interrupt is released and the flowchart returns to step S41 of FIG. 9.

Figure 11:
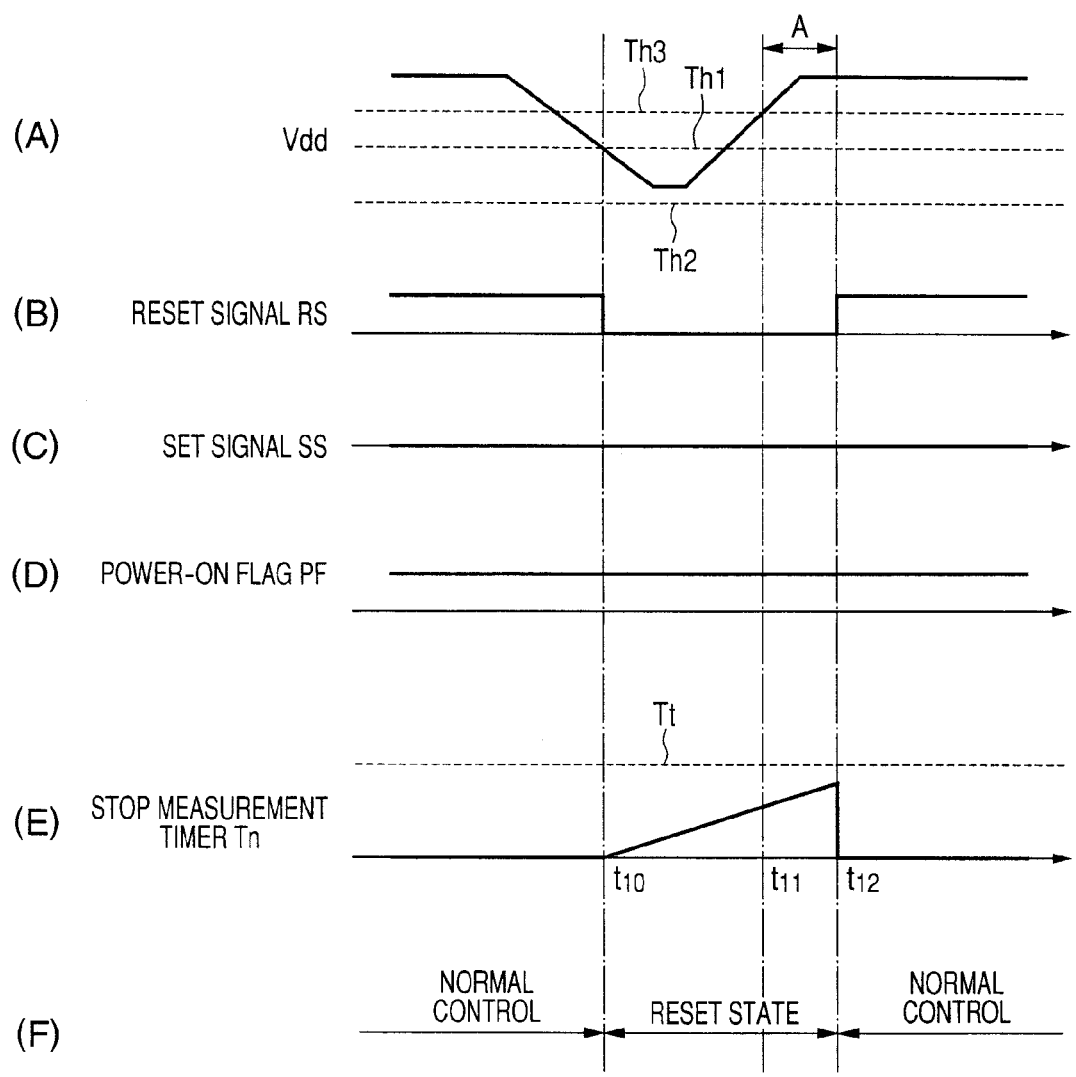
FIG. 11 is a time chart showing an operation example of the invention, in which reset time is within a threshold.

Next, an operation at the time when the stop time Tn does not exceed the threshold Tt will be described with reference to a time chart of FIG. 11.

When a power source voltage Vdd becomes a threshold Th1 or less at a point in time t10 as shown in FIG. 11(A), a reset signal RS is outputted as shown in FIG. 11(B) and also measurement of the time measurement part 80 (timer for stop time measurement) is started as shown in FIG. 11(E). Also, the power source voltage Vdd becomes a threshold Th3 or more at a point in time t11, so that when predetermined time A has elapsed from the point in time t11 (point in time t12), the reset signal RS is released. Since a power-on flag PF remains "1" on the threshold Tt or less at this time, the time measurement part 80 omits RAM initialization, initial diagnosis and release change operation, and it becomes normal control immediately after the point in time t2. Therefore, the state is normal control to the point in time t10 and is a reset state at the points in times t10 to t11 and is normal control after the point in time t12 as shown in FIG. 11(F).

Figure 12:
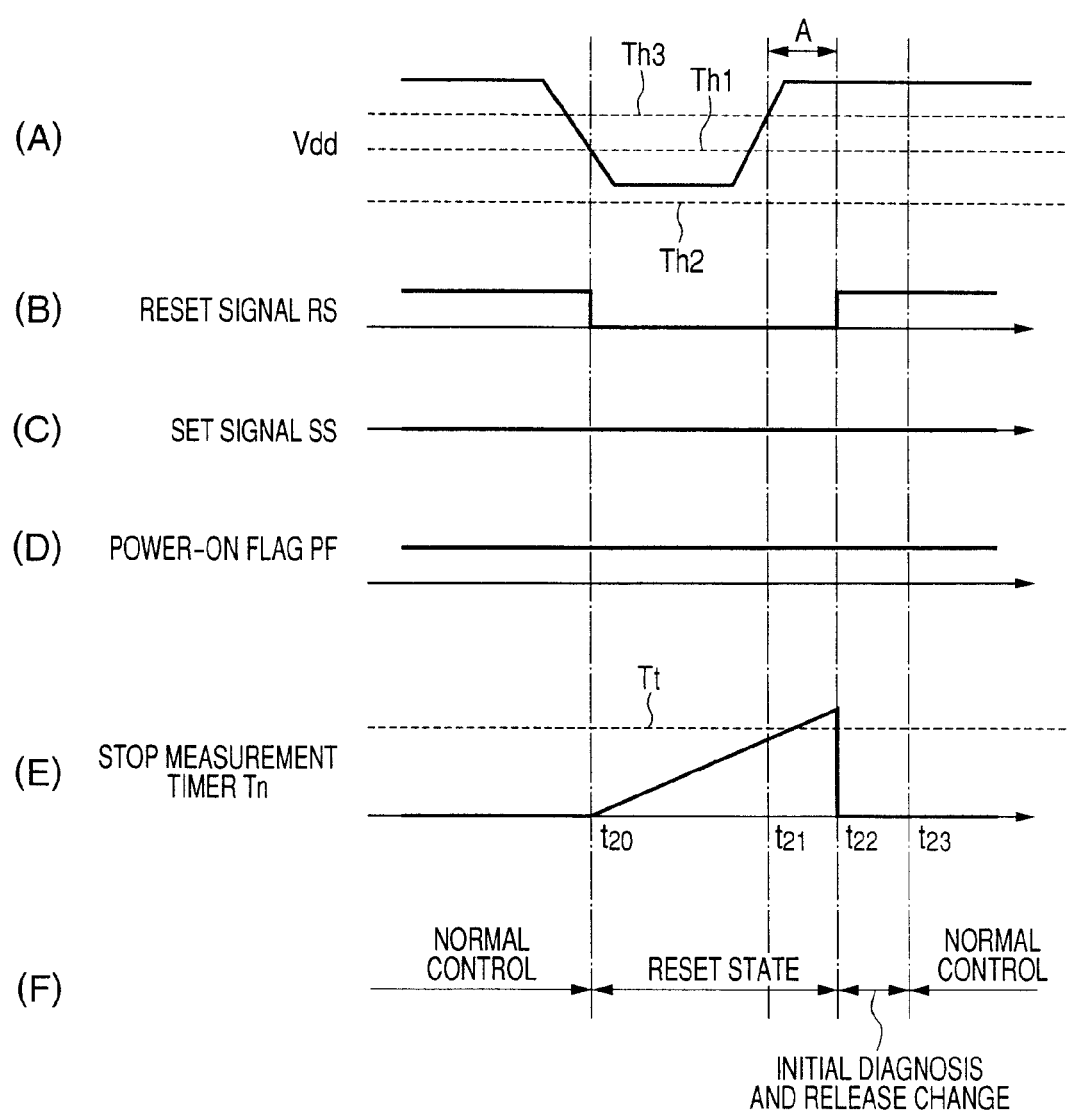
FIG. 12 is a time chart showing an operation example of the invention, in which reset time is a threshold or more.
Figure 13:
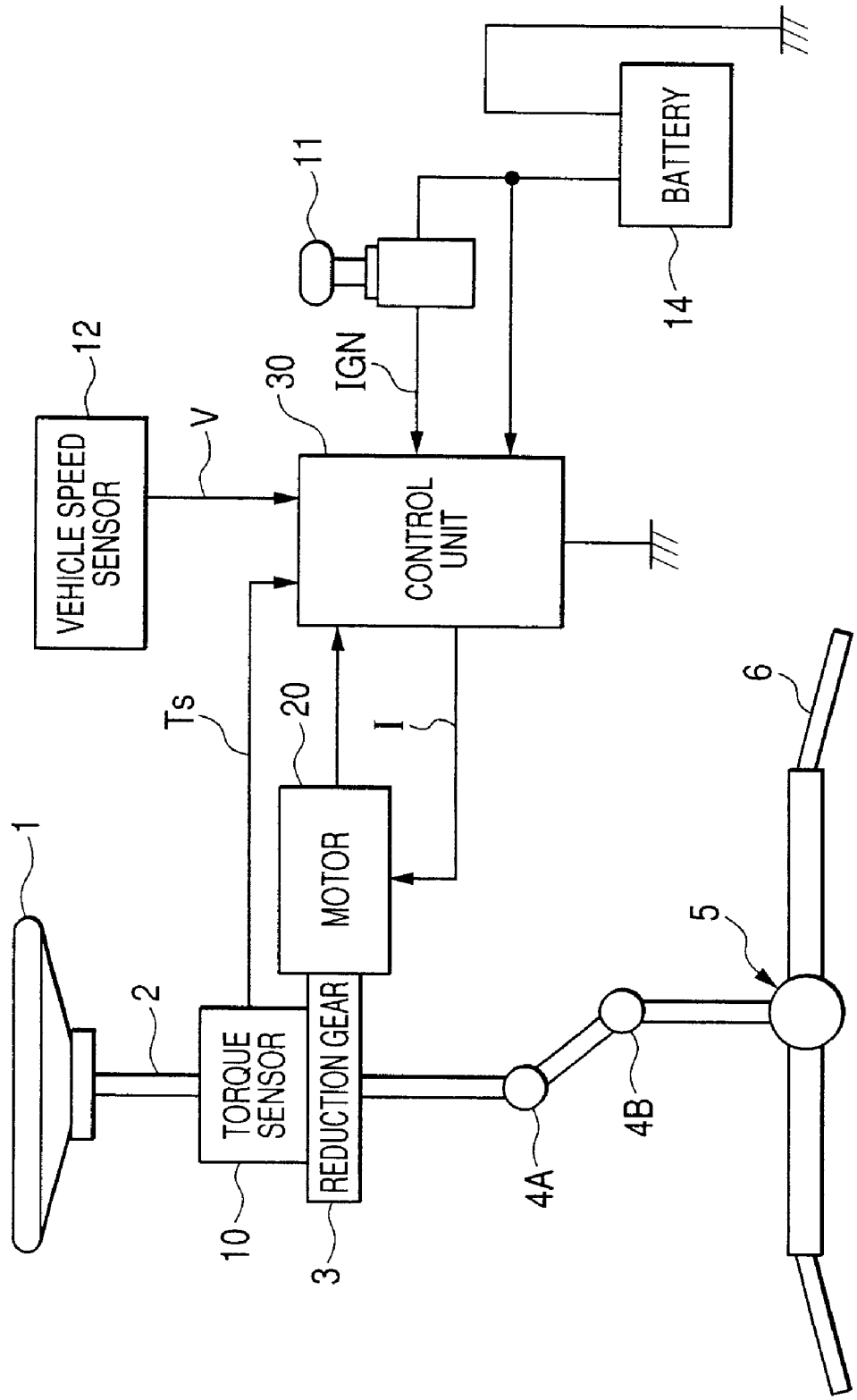
FIG. 13 is a diagram showing a mechanism example of a general steering apparatus.
Figure 14:
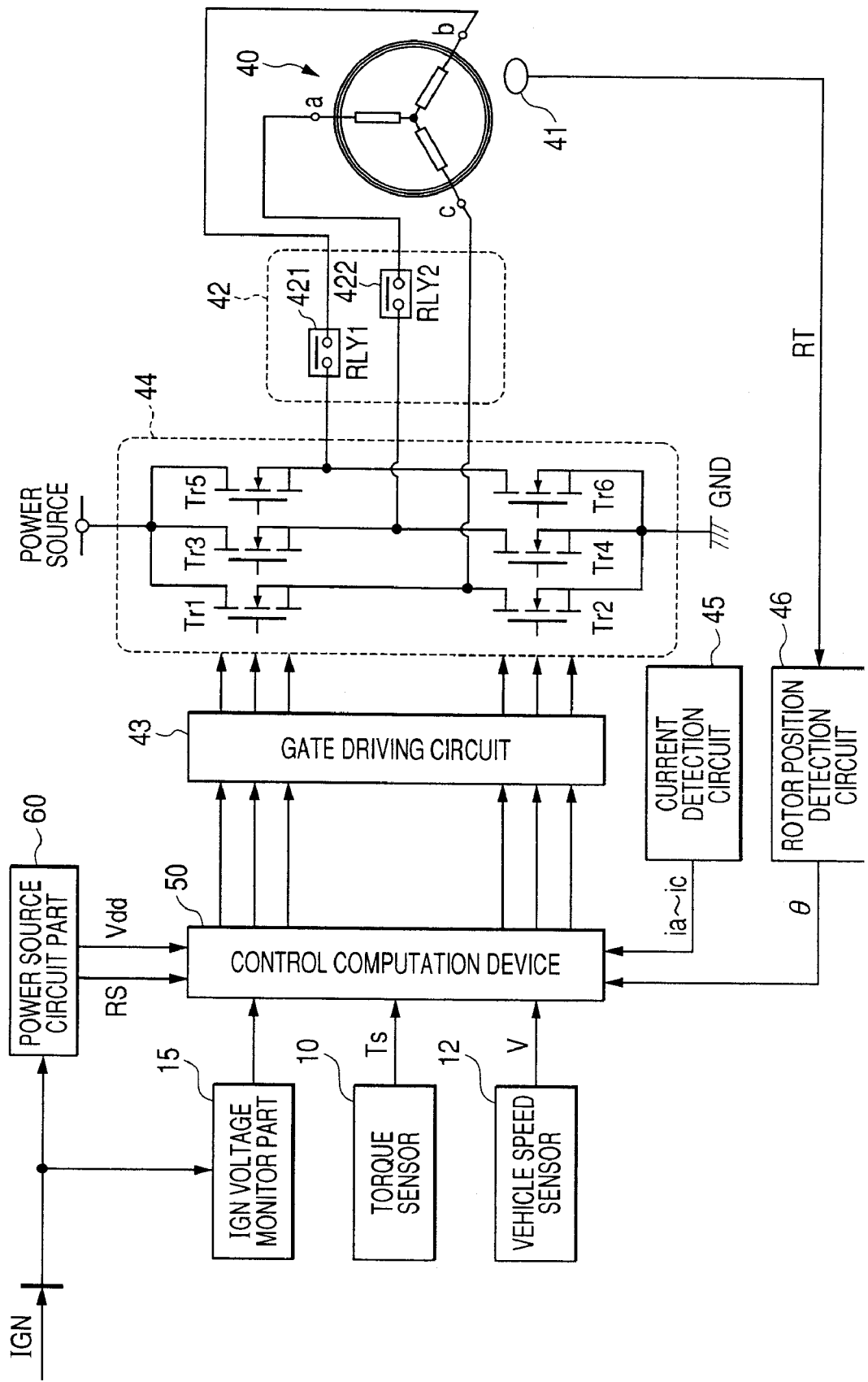
FIG. 14 is a block diagram showing one example of a control system of a conventional electric power steering apparatus.

In an example of FIG. 12, when a power source voltage Vdd becomes a threshold Th1 or less at a point in time t20, a reset signal RS is outputted as shown in FIG. 12(B) and also measurement of the time measurement part 80 (timer for stop time measurement) is started as shown in FIG. 12(E). Then, when reset measurement time Tn exceeds a threshold Tt even in the case where the power source voltage Vdd does not become a threshold Th2 or less and the power source voltage Vdd exceeds a threshold Th3 at a point in time t21, it is determined that the stop time Tn is larger than the threshold Tt in step S40 after the reset signal RS is released at a point in time t22 at which predetermined time A has elapsed, so that predetermined time from the point in time t22 to a point in time t23 is allocated to initial diagnosis and release change and an operation method for starting a steering assist at the time of restarting is decided. In this case, initial diagnosis and assist release change control are performed. Therefore, the state is normal control to the point in time t20 and is a reset state at the points in times t20 to t22 and is the initial diagnosis and release change at the points in times t22 to t23 and becomes normal control after the point in time t23 as shown in FIG. 12(F).

According to the third and fourth embodiments as described above, the presence or absence of release change processing and initial diagnosis of restarting of the control computation device 50 can be executed automatically according to time and a state of the power source voltage Vdd.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A control device of an electric power steering apparatus, which controls a motor for applying steering assist torque to a steering mechanism through a driving part, comprising:
   a control computation part that computes a current command value and controls the motor based on the computed current command value;
   a first voltage reduction monitoring part that generates a reset signal for stopping the control computation part at the time of a low voltage; and
   a second voltage reduction monitoring part that holds reduction extent information about a power source voltage,
   wherein the first and second voltage reduction monitoring parts cooperate together to monitor a reduction in the power source voltage of the control computation part.

2. The control device of the electric power steering apparatus as set forth in claim 1, wherein
   the second voltage reduction monitoring part is provided inside the control computation part.

3. The control device of the electric power steering apparatus as set forth in claim 1, wherein
   the reset signal is released when a first predetermined time has elapsed after the power source voltage is restored.

4. The control device of the electric power steering apparatus as set forth in claim 3, wherein
   the reduction extent information is released when the first predetermined time has elapsed.

5. The control device of the electric power steering apparatus as set forth in claim 3, further comprising:
   an operation decision part that decides an operation method for starting a steering assist operation based on information about the second voltage reduction monitoring part at the time of releasing the reset signal and restarting the control computation part.

6. The control device of the electric power steering apparatus as set forth in claim 1, further comprising:
   a time measurement part that measures stop time during which the reset signal is generated.

7. The control device of the electric power steering apparatus as set forth in claim 6, wherein
   an operation method for starting a steering assist at the time of restarting is decided based on a second predetermined time of the measurement time of the time measurement part.

8. The control device of the electric power steering apparatus as set forth in claim 1, wherein
   the control computation part is constructed of at least one of a microcomputer, an MPU and an MCU.

* * * * *